US007545953B2

(12) United States Patent
Lai et al.

(10) Patent No.: US 7,545,953 B2
(45) Date of Patent: Jun. 9, 2009

(54) APPARATUS FOR SETTING IMAGE MONITORING AREA AND METHOD THEREFOR

(75) Inventors: Chin-Ding Lai, No. 32-1, Lane 432, Jhongjheng Rd., Jhonghe City, Taipei County (TW); Chin-Lun Lai, No. 2, Alley 5, Lane 263, Liancheng Rd., Jhonghe City, Taipei County (TW)

(73) Assignees: Chin-Ding Lai (TW); Chin-Lun Lai (TW); Li-Shih Liao (TW); Hai-Chou Tien (TW)

( * ) Notice: Subject to any disclaimer, the term of this patent is extended or adjusted under 35 U.S.C. 154(b) by 814 days.

(21) Appl. No.: 11/061,660

(22) Filed: Feb. 22, 2005

(65) Prior Publication Data

US 2005/0271249 A1 Dec. 8, 2005

(30) Foreign Application Priority Data

Jun. 4, 2004 (TW) .............................. 93116132 A

(51) Int. Cl.
*G06K 9/00* (2006.01)

(52) U.S. Cl. ...................................... 382/103; 348/152

(58) Field of Classification Search ....................... None
See application file for complete search history.

(56) References Cited

U.S. PATENT DOCUMENTS

| | | | | |
|---|---|---|---|---|
| 5,969,755 | A * | 10/1999 | Courtney | 348/143 |
| 6,344,874 | B1 * | 2/2002 | Helms et al. | 348/164 |
| 6,445,409 | B1 * | 9/2002 | Ito et al. | 348/155 |
| 6,714,237 | B2 * | 3/2004 | Lee et al. | 348/152 |
| 6,791,603 | B2 * | 9/2004 | Lazo et al. | 348/169 |
| 6,819,783 | B2 * | 11/2004 | Goldberg et al. | 382/115 |
| 7,023,469 | B1 * | 4/2006 | Olson | 348/152 |
| 7,064,776 | B2 * | 6/2006 | Sumi et al. | 348/169 |
| 2004/0189804 | A1 * | 9/2004 | Borden et al. | 348/169 |
| 2004/0223054 | A1 * | 11/2004 | Rotholtz | 348/143 |

* cited by examiner

*Primary Examiner*—Matthew C Bella
*Assistant Examiner*—Yuzhen Ge
(74) *Attorney, Agent, or Firm*—Bacon & Thomas, PLLC

(57) ABSTRACT

The present invention is to provide a method for setting an image monitoring area and an apparatus thereof, comprising setting a trigger parameter and a stop parameter in an image processing software, calculating and analyzing a series of continuous image frames taken in a predetermined space by an image fetching unit by running the image processing software, determining whether the trigger parameter is included in a target image in the image frames, responsive to the determination being affirmative, automatically calculating, analyzing, and recording a trace of the target image moving in the image frames, stopping the recording of the trace when the stop parameter is detected in the target image, and setting an area defined by the trace of the target image as an image monitoring area to be monitored.

3 Claims, 6 Drawing Sheets

APPARATUS FOR SETTING IMAGE MONITORING AREA AND METHOD THEREFOR

FIELD OF THE INVENTION

The present invention relates to image monitoring, more particularly to an apparatus for setting an image monitoring area and a method therefore through calculating and analyzing a series of continuous image frames of an object taken in a predetermined space by an image fetching unit and then automatically setting an area defined by the trace of the object as an image monitoring area to be monitored.

BACKGROUND OF THE INVENTION

Conventionally, a variety of monitoring devices have been devised and some of them are already employed in applications including security, prevention of burglary, access management, no man bank, military purposes, toys, and industrial control for monitoring the appearance of foreign objects, human being or the like in a specific space (e.g., sensitive area). Typically, the monitoring devices are classified as detecting ones and sensing ones as detailed below.

As for detecting technique, it involves that a detecting member transmits signals in the form of or by means of laser, IR (infrared), ultrasonic waves, or radar to a receiving member. A signal is sent back to the detecting member from a receiver of the receiving member (i.e., target). The detecting member then analyzes the strength and/or phase lags of the signal or the like for obtaining data including direction, size, and distance of the receiving member by intensive calculation. The detecting member will respond accordingly thereafter.

As for sensing technique, it involves that radiation from a target (e.g., IR transmitted from a human being) due to temperature, or changes of environmental parameters (e.g., turbulence or differences of images taken by a camera) due to motion of the target can be sensed by a sensing member. Next, data including direction, size, and distance of the target can be obtained by intensive calculation.

However, both prior techniques suffered from several disadvantages. For example, it is only possible of determining whether there is a target, whether the target is in motion if the target exists, and imprecise data about motion of the target if the target moves. As for control, a user has to set system parameters by means of an input device (e.g., remote control, switch, or computer) prior to control. For example, techniques of employing computer to display digital images for monitoring targets in a specific environment have been devised recently. Also, such techniques have been widely employed in digital monitoring systems. However, it requires a user to set environmental parameters by means of computer. As such, it cannot obtain precise data about motion of the target or any other useful data about the target.

In addition, the provision of signal transmission and receiving devices in the detecting member not only may increase system complexity and cost but also may make an incorrect measurement. As a result, an erroneous result is obtained and precious power is consumed undesirably. As for sensing technique, it depends on reliable factors including ambient temperature, percentage of the human body being exposed, etc. Thus, its accuracy is low. Moreover, a specific input device is required for control purpose when either the detecting or the sensing technique is carried out. This will inevitably increase the equipment expenditure. In general, it is not applicable for ordinary situations.

Thus, it is desirable to combine a typical camera and an independent processing unit as a unitary system in which the camera is adapted to take pictures of a moving target in a specific space. Further, motion of the target can be determined by performing an image recognition process. As such, a corresponding operation is conducted in which an area defined by trace of the moving target is set as an image monitoring area. Alternatively, the area is employed to open, close, adjust, set, enable, or disable related equipment or an automatic system. Advantageously, it is possible of overcoming the above drawbacks of prior art by providing a fully automatic monitoring system without involvement of switches, keys, or any input devices.

SUMMARY OF THE INVENTION

After considerable research and experimentation, an apparatus for setting image monitoring area and a method therefor according to the present invention have been devised so as to overcome the above drawback of the prior art.

It is an object of the present invention to provide a method for setting an image monitoring area, comprising setting a trigger parameter and a stop parameter in an image processing software, calculating and analyzing a series of continuous image frames taken in a predetermined space by an image fetching unit by running the image processing software, determining whether the trigger parameter is included in a target image in the image frames, responsive to the determination being affirmative, automatically calculating, analyzing, and recording a trace of the target image moving in the image frames, stopping the recording of the trace when the stop parameter is detected in the target image, and setting an area defined by the trace of the target image as an image monitoring area to be monitored.

It is another object of the present invention to provide an apparatus for setting an image monitoring area, comprising an image fetching unit disposed in a housing for continuously fetching image frames from a predetermined space; and a processing unit disposed in the housing for controlling operations of all electronic parts in the housing, the processing unit being coupled to the image fetching unit for receiving the image frames from the image fetching unit, wherein the processing unit is adapted to run an image processing software installed in the apparatus to calculate and analyze a target image in the image frames; after determining that either a trigger parameter or a stop parameter contained in the image processing software is included in the target image in one of the image frames, the processing unit is adapted to record or not record a trace of the target image moving in the other image frames; and the processing unit is adapted to set an area defined by the trace of the target image as an image monitoring area to be monitored by the apparatus.

It is a further object of the present invention to provide a system for controlling an electronic device by monitoring images. The system is established between an image monitoring device and the electronic device. The image monitoring device is adapted to set an image monitoring area in the image frame based on motion of a target image in continuously fetched image frames. After setting the image monitoring area, the image monitoring device monitors the image monitoring area in order to determine whether there is a target image entering the image monitoring area. If yes, the image monitoring device then automatically generates a trigger signal which is in turn sent to the electronic device for enabling the electronic device to perform a predetermined action such as alarm, closing an electric door, or recording images of the image monitoring area.

The above and other objects, features and advantages of the present invention will become apparent from the following detailed description taken with the accompanying drawings.

DETAILED DESCRIPTION OF THE PREFERRED EMBODIMENTS

Figure 1:
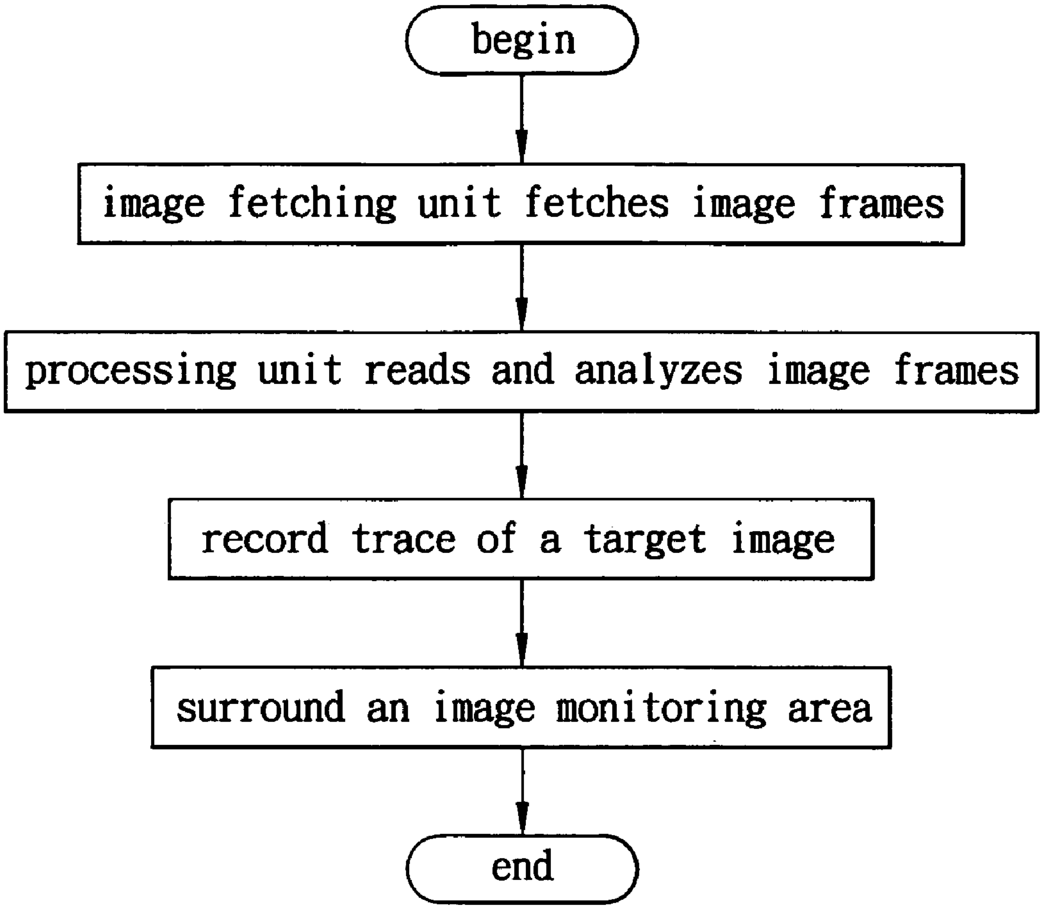
FIG. 1 is a flow chart according to the invention.
Figure 2:
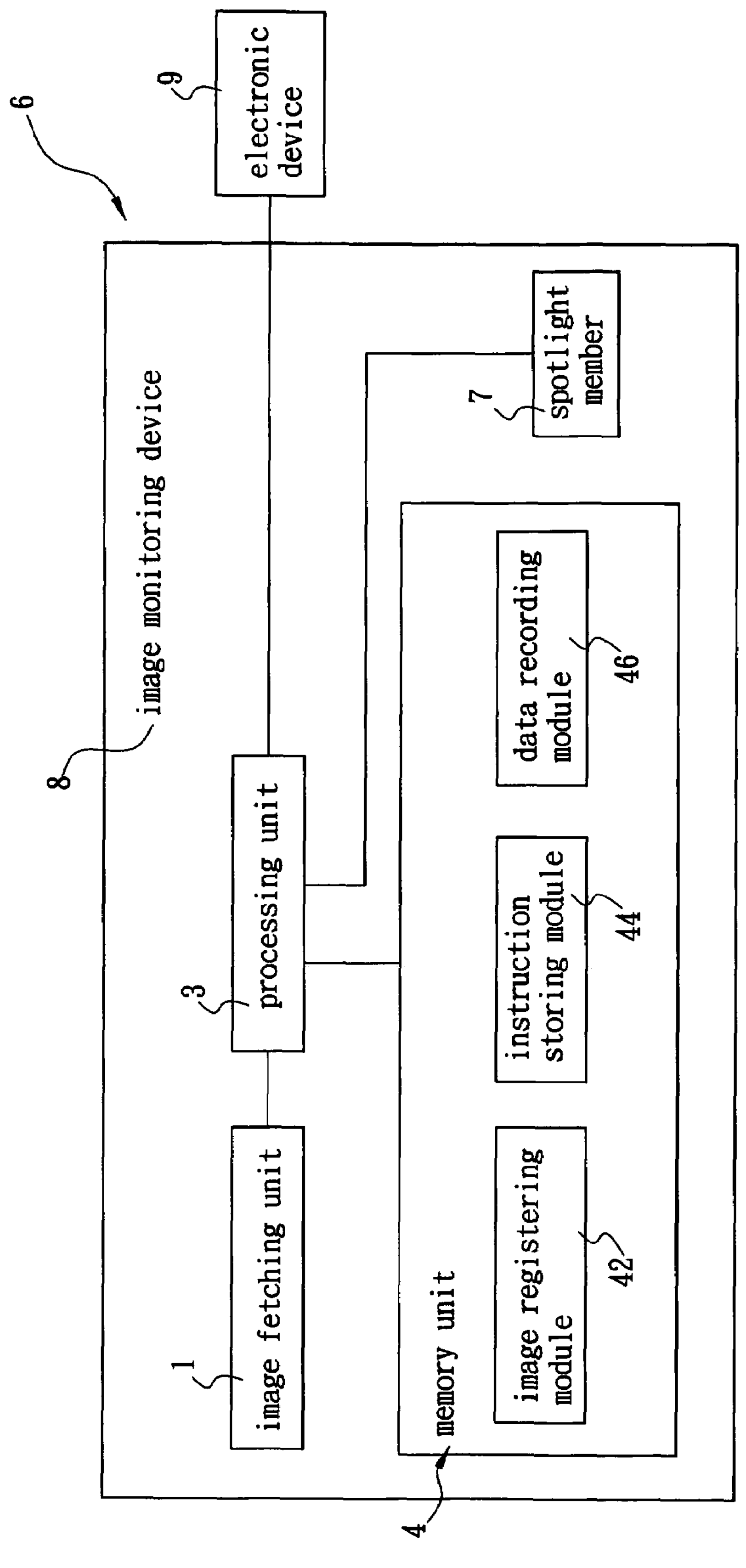
FIG. 2 is a block diagram illustrating the connection of an image fetching device and an electronic device according to the invention.

Referring to FIGS. 1 and 2, an apparatus for setting image monitoring area and method therefor in accordance with the invention are illustrated. The method comprises setting a trigger parameter and a stop parameter in an image processing software 40 (see FIG. 4), calculating and analyzing a series of continuous image frames 2 taken in a specific space by an image fetching unit 1 by running the image processing software 40, determining whether the trigger parameter is included in a target image 5 in the image frames 2, responsive to the determination being affirmative, automatically calculating, analyzing, and recording a trace A of the target image 5 moving in the image frames 2, stopping the recording of the trace A when the stop parameter is detected in the target image 5, and setting an area defined by the trace A of the target image 5 as an image monitoring area B to be monitored by the apparatus.

Referring to FIG. 2 again, the apparatus for setting an image monitoring area according to the invention is enclosed in a housing 6. The housing 6 comprises a processing unit 3 and an image fetching unit 1. The processing unit 3 is adapted to control operations of all electronic parts in the housing 6 and is coupled to the image fetching unit 1. The image fetching unit 1 is adapted to continuously fetch images from a specific space and send image frames 2 of the images (see FIG. 3) to the processing unit 3. The processing unit 3 then executes an image processing software 40 installed in the apparatus to calculate and analyze a target image 5 in the image frames 2. After determining that the trigger parameter is included in the target image 5 in the image frames 2, the processing unit 3 is adapted to automatically calculate, analyze, and record a trace A of the target image 5 moving in the subsequent image frames 2. The processing unit 3 then continues the above operations with respect to the subsequent image frames 2. The recording of the trace A is stopped immediately after the stop parameter set by the image processing software 40 is detected in the target image 5 by the processing unit 3. Eventually, set an area defined by the trace A of the target image 5 as an image monitoring area B to be monitored by the apparatus.

In the embodiment, the housing 6 further comprises a memory unit 4 coupled to the processing unit 3. The image processing software 40 is provided in the memory unit 4 such that the processing unit 3 is able to run the image processing software 40 for calculating and analyzing the target image 5. Also, the apparatus further comprises a spotlight member 7 coupled to the processing unit 3. As such, the processing unit 3 is adapted to enable the spotlight member 7 to project a beam of light to a specific space. As an end, the image fetching unit 1 is able to fetch a sufficiently illuminated image frame 2.

In the embodiment the image fetching unit 1 is implemented as a CMOS (Complementary Metal-Oxide Semiconductor) or a CCD (Charge Coupled Device). The memory unit 4 comprises an image registering module 42, an instruction storing module 44, and a plurality of data recording modules 46. The image registering module 42 is adapted to store the image frames 2 fetched by the image fetching unit 1. The instruction storing module 44 is adapted to store the image processing software 40. The data recording modules 46 are adapted to record data (e.g., data about the image monitoring area B) obtained by calculation and analysis performed by the processing unit 3. The instruction storing module 44 is implemented as a ROM (Read-Only Memory) such as EEPROM (Electrically Erasable Programmable Read-Only Memory). Either one of the image registering module 42 and the data recording module 46 is implemented as a DRAM (Dynamic Random-Access Memory).

Referring to FIG. 2 again, the invention is directed to a system for controlling an electronic device by monitoring images. The system is established between an image monitoring device 8 and an electronic device 9. The image monitoring device 8 is adapted to set an image monitoring area B in the image frame 2 based on motion of a target image 5 in continuously fetched image frames 2. After setting the image monitoring area B, the image monitoring device 8 monitors the image monitoring area B in order to determine whether there is a target image 5 entering the image monitoring area B. If yes, the image monitoring device 8 then automatically generates a trigger signal which is in turn sent to the electronic device 9 for enabling. The enabled electronic device 9 then performs a predetermined action such as alarm, closing an electric door, or recording images of the image monitoring area B.

In a preferred embodiment of the invention, after the image monitoring device 8 of the system detecting that the target image 5 has left the image monitoring area B, the image monitoring device 8 immediately automatically generates a stop signal which is in turn sent to the electronic device 9 for disabling all actions being taken by the electronic device 9. As an end, the electronic device 9 returns to an original state where no predetermined action is taken.

Figure 4:
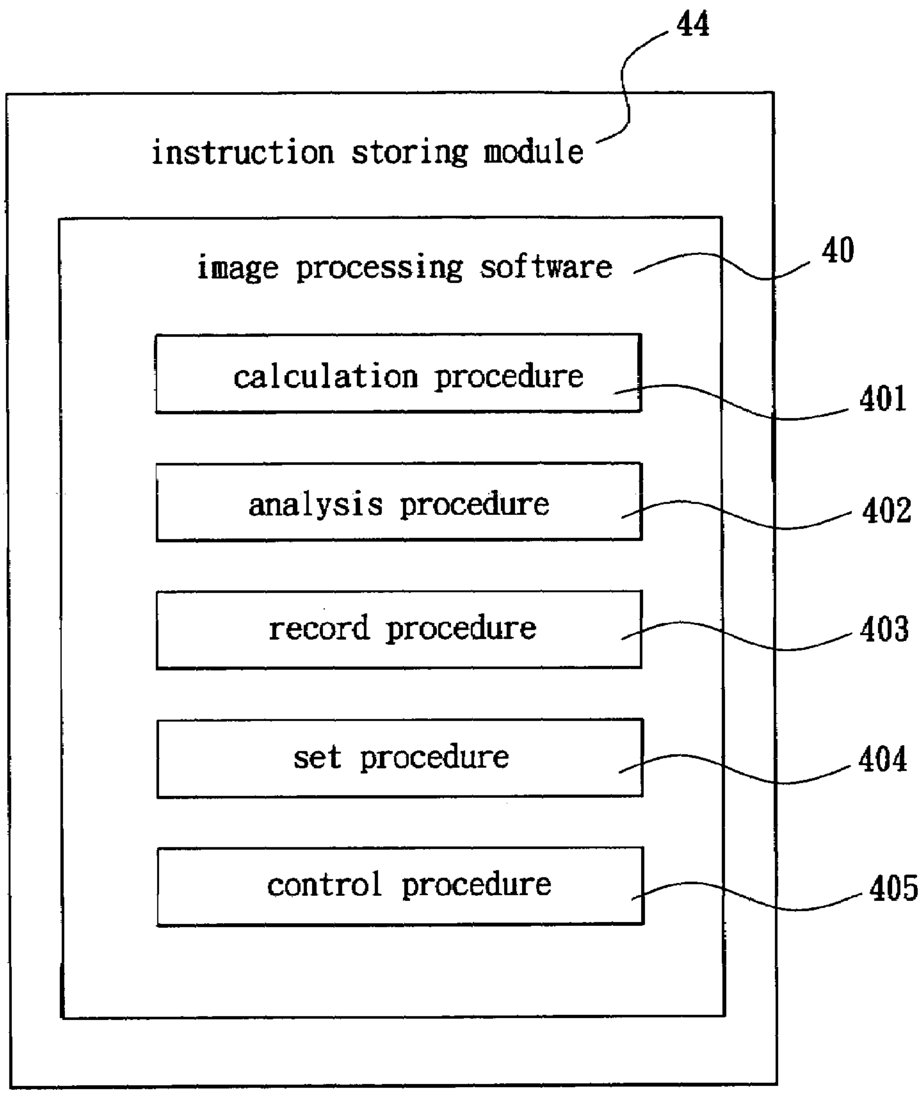
FIG. 4 schematically depicts parts of instruction storing module according to the invention.

Referring to FIG. 4 in conjunction with FIG. 2, in the embodiment the image processing software 40 comprises a calculation procedure 401, an analysis procedure 402, a record procedure 403, and a set procedure 404. The processing unit 3 is adapted to run the calculation procedure 401 to perform calculation (e.g., vector calculation) with respect to the image frames 2. A result of the calculation is then sent to the memory unit 4 for storage. The analysis procedure 402 contains the trigger parameter and the stop parameter. The processing unit 3 is adapted to run the analysis procedure 402 to analyze whether the target image 5 contains the trigger parameter or the stop parameter. If the trigger parameter is included in the target image 5, the processing unit 3 records a trace A of the target image 5. Moreover, the processing unit 3 is adapted to run the record procedure 403 to record the trace A of the target image 5 in the memory unit 4. The processing unit 3 is adapted to run the set procedure 404 to read the trace A of the target image 5 and set an area defined by the trace A of the target image 5 as an image monitoring area B.

Figure 3:
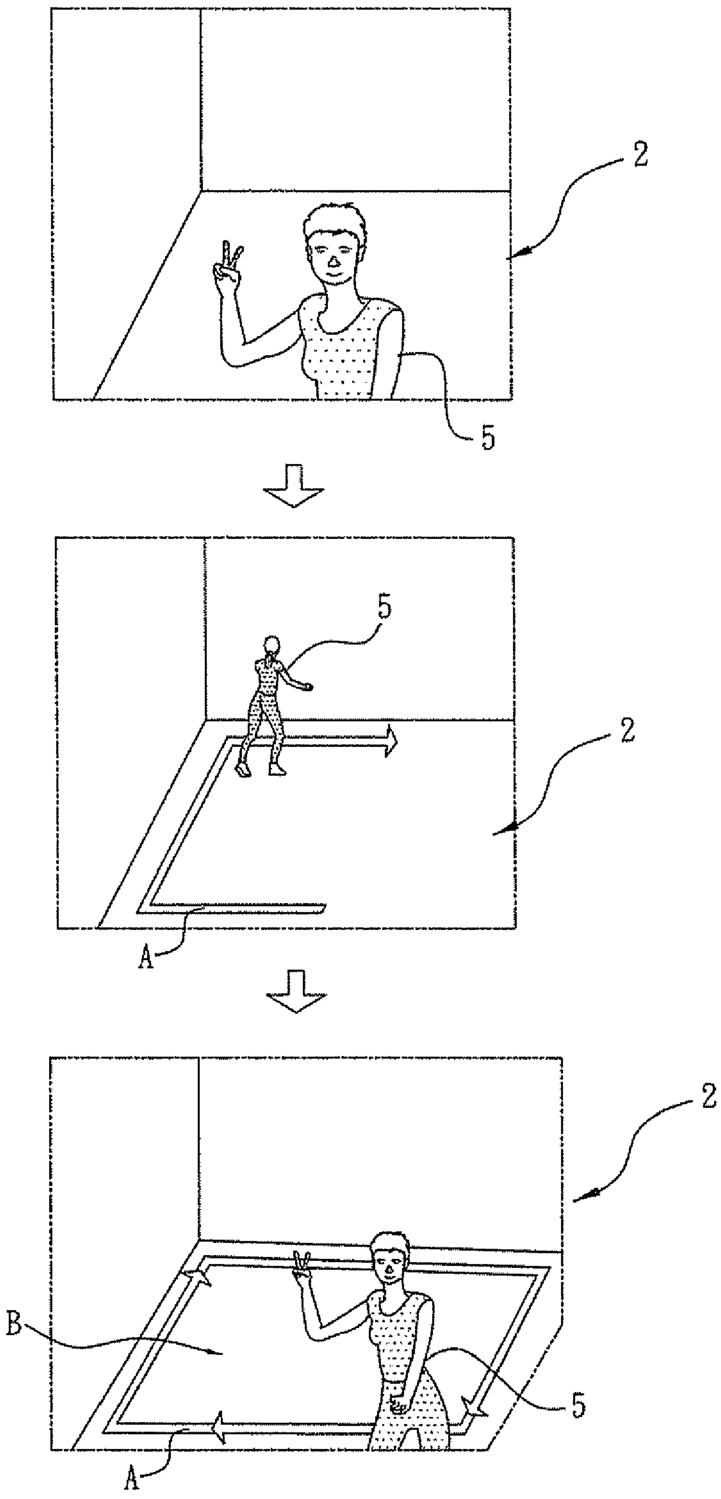
FIG. 3 is a view schematically depicting image frames according to the invention.

In the embodiment, as referring to FIG. 3, in the process of setting the image monitoring area B by the processing unit 3 by running the set procedure 404, if a starting point of the trace A of the target image 5 and an end point thereof are not at a straight line, the set procedure 404 will draw a straight line from the start point to the end point so as to surround an area which is set as the image monitoring area B. In another case of the trace A of the target image 5 being an intersected one, the set procedure 404 will connect an intersection most proximate the end point to the starting point of the trace A so as to surround an area which is set as the image monitoring area B.

In the embodiment, the image processing software 40 further comprises a control procedure 405. After setting the image monitoring area B by the processing unit 3, the processing unit 3 is adapted to run the analysis procedure 402 to analyze the image monitoring area B in order to determine whether there is a target image 5 entering the image monitoring area B. If yes, the processing unit 3 runs the control procedure 405 to generate a trigger signal and send the same to the electronic device 9 for enabling. The enabled electronic device 9 then performs a predetermined action.

Moreover, after the processing unit 3 detecting that the target image 5 has left the image monitoring area B by analyzing the image monitoring area B by running the analysis procedure 402, the processing unit 3 immediately runs the control procedure 405 to generate a stop signal which is in turn sent to the electronic device 9 for disabling all actions being taken by the electronic device 9. As an end, the electronic device 9 returns to an original state where no predetermined action is taken.

Figure 5:
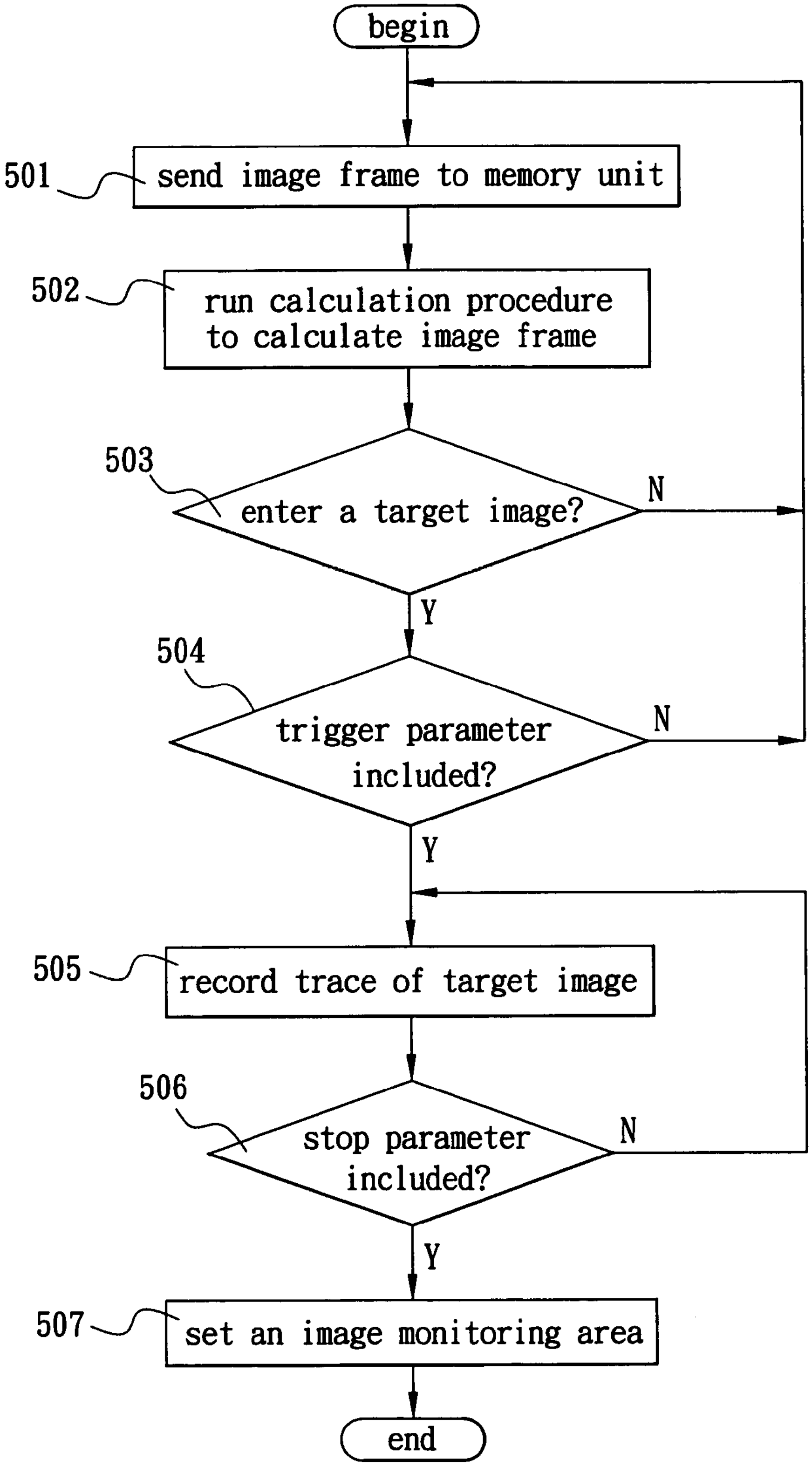
FIG. 5 is a flow chart illustrating the setting of an image monitoring area according to the invention.

An exemplary flow chart will be described in detail below for understanding the processing unit 3 how to run the image processing software 40 to set the image monitoring area B as carried out by the invention. In the process of setting the image monitoring area B, the target image 5 is represented by a person. Also, the trigger parameter means that a V-shaped sign is raised by the hand of the person and the stop parameter means that a V-shaped sign is raised again by the hand of the person. Responsive to continuously fetching a plurality of image frames 2 with respect to a specific space by the image fetching unit 1, the processing unit 3 performs the following steps to set the image monitoring area B as illustrated in FIG. 5.

In step 501, send the image frames 2 to the memory unit 4 for storage via the processing unit 3.

In step 502, run the calculation procedure 401 to perform calculation with respect to the image frames 2. A result of the calculation is then sent to the memory unit 4 for storage.

In step 503, run the analysis procedure 402 to analyze whether there is a target image 5 entering the image frames 2. If yes, the process goes to step 504. Otherwise, the process loops back to step 501.

In step 504, run the analysis procedure 402 to analyze the calculation result of the subsequent image frames 2 in order to determine whether the trigger parameter is included in the target image 5. If yes, the process goes to step 505. Otherwise, the process loops back to step 501.

In step 505, run the analysis procedure 402 to analyze the subsequent image frames 2 for detecting a trace A of the target image 5 which is in turn recorded in the memory unit 4.

In step 506, run the analysis procedure 402 to analyze the calculation result of the subsequent image frames 2 in order to determine whether the stop parameter is included in the target image 5. If yes, the process goes to step 507. Otherwise, the process loops back to step 505.

In step 507, run the set procedure 404 to read the trace A of the target image 5 and set an area defined by the trace A of the target image 5 as an image monitoring area B based on the trace A.

Figure 6:
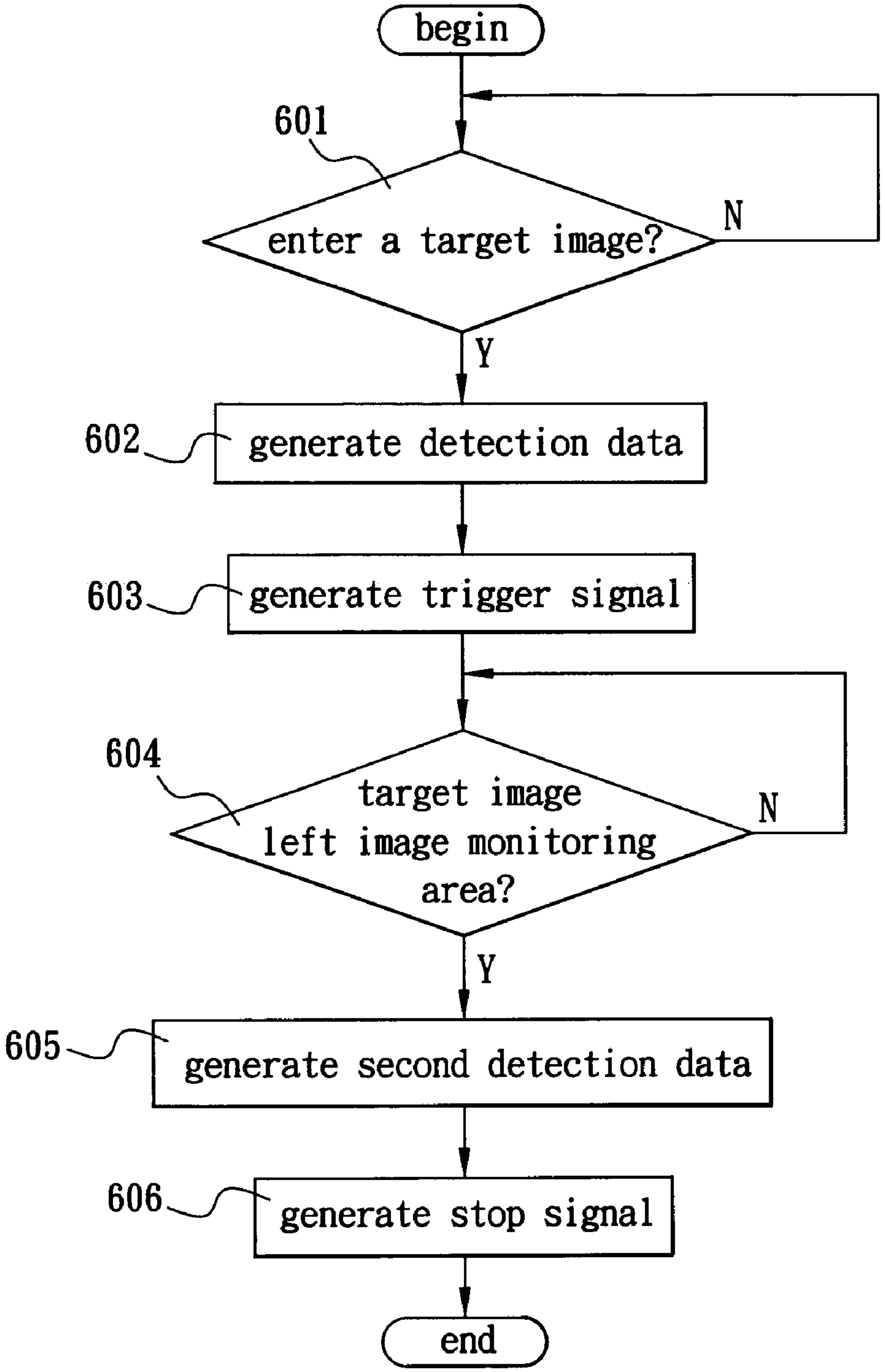
FIG. 6 is flow chart illustrating actions taken by the image fetching device and the electronic device according to the invention.

After the processing unit 3 has set the image monitoring area B, the processing unit 3 performs the following steps to generate a trigger signal and a stop signal and send the same to the electronic device 9. The electronic device 9 will take subsequent actions in response to the trigger or the stop signal. These are best illustrated in another exemplary flow chart of FIG. 6.

In step 601, run the analysis procedure 402 to analyze whether there is a target image 5 entering the image monitoring area B. If yes, the process goes to step 602. Otherwise, the process loops back to itself.

In step 602, run the analysis procedure 402 to create detection data which is in turn stored in the memory unit 4.

In step 603, run the set procedure 404 to read the detection data from the memory unit 4 so as to generate a trigger signal and send the same to the electronic device 9 for enabling. The enabled electronic device 9 then performs a predetermined action.

In step 604, run the analysis procedure 402 to determine whether the target image 5 in the image monitoring area B has left the image monitoring area B. If yes, the process goes to step 605. Otherwise, the process loops back to itself.

In step 605, run the analysis procedure 402 to create second detection data which is in turn stored in the memory unit 4.

In step 606, run the set procedure 404 to read the second detection data from the memory unit 4 so as to generate a stop signal and send the same to the electronic device 9 for disabling all actions being taken by the electronic device 9. As an end, the electronic device 9 returns to an original state where no predetermined action is taken.

By configuring as above, it is contemplated by the invention that the fetched image frames 2 are utilized by the image fetching unit 1. Further, the invention runs the image processing software 40 to process data including contour of human being, specific action, body gesture, hand sign, moving direction, and/or complexion about the image frames 2. Furthermore, the invention tries to find or identify any image changes of the image frames 2 as a basis for enabling or disabling the electronic device 9 or setting the system. As a result, the following effects are achieved by the invention:

i) It is possible of better understanding any image change in a specific space by analyzing image frames 2 fetched by an image fetching unit 1.

ii) It is possible of decreasing the need for additional input/output devices by taking the analysis of the image frames 2 as a basis of setting or control.

iii) The constituent components of the apparatus or the system are simple and cost effective. For example, the image fetching unit 1 is implemented as a CMOS.

iv) There are a number of techniques (e.g., vector algorithm) available for running the calculation procedure 401 of the image processing software 40 (i.e., highly adaptable). Thus, it is possible of adapting the invention to different applications.

While the invention herein disclosed has been described by means of specific embodiments, numerous modifications and variations could be made thereto by those skilled in the art without departing from the scope and spirit of the invention set forth in the claims.

What is claimed is:

1. A method for setting an image monitoring area, which is implemented to an image monitoring device installed with an image processing software comprising a trigger parameter and a stop parameter the trigger parameter and stop parameter are included in an analysis procedure, for enabling the image monitoring device to utilize the image processing software to calculate and analyze a series of continuous image frames taken in a specific space by an image fetching unit and further including a calculation procedure, a record procedure and a set procedure comprising steps of:

determining whether or not a target image in one of the image frames includes the trigger parameter including;

running the calculation procedure to perform calculation with respect to the image frames and sending a result of the calculation to a memory unit for storage;

running the analysis procedure to analyze the result of the calculation in order to determine whether the target image enters one of the image frames;

when determining that the target image enters the image frame, running the analysis procedure to analyze the result of the calculation in order to determine whether the target image contains the trigger parameter;

when determining that the target image contains the trigger parameter, automatically calculating, and analyzing subsequent image frames for procuring a trace of the target image, running the analysis procedure to analyze the trace of the target image moving in the image frames and recording the trace;

running the record procedure to record the trace of the target image in the memory unit;

determining whether or not the stop parameter is included in the target image in one of the subsequent image frames including;

running the analysis procedure to analyze the result of the calculation in order to determine whether the target image contains the stop parameter;

when determining that the target image contains the stop parameter in the subsequent image frame, running the set procedure to read the trace of the target image, stopping the recording of the trace of the target image and setting the area defined by the trace of the target image as the image monitoring area.

2. The method of claim 1, further comprising a control procedure such that after setting the image monitoring area the analysis procedure is adapted to run and analyze the image monitoring area in order to determine whether the target image enters the image monitoring area, and the control procedure is adapted to run and generate a trigger signal and send the trigger signal to an electronic device for enabling the electronic device to perform a predetermined action in response to determining that the target image has entered the image monitoring area.

3. The method of claim 2, wherein, when determining that the target image has left the image monitoring area the control procedure is adapted to run and generate a stop signal and send the stop signal to the electronic device for disabling all actions being taken by the electronic device and causing the electronic device to return to an original state where no predetermined action is taken.

* * * * *